United States Patent [19]

Bonar

[11] 4,212,679

[45] Jul. 15, 1980

[54] METHOD OF MAKING MAGNESITE GRAIN

[75] Inventor: Kermit M. Bonar, Clearfield, Pa.

[73] Assignee: Dresser Industries, Inc., Dallas, Tex.

[21] Appl. No.: 941,705

[22] Filed: Sep. 12, 1978

Related U.S. Application Data

[63] Continuation-in-part of Ser. No. 499,682, Aug. 28, 1974, abandoned.

[51] Int. Cl.$^2$ .................... C04B 35/48; C04B 35/04
[52] U.S. Cl. .......................................... 106/57; 106/58
[58] Field of Search ............................ 106/57, 63, 58

[56] References Cited

U.S. PATENT DOCUMENTS

| | | | |
|---|---|---|---|
| 1,952,120 | 3/1934 | Comstock | 106/57 |
| 2,281,477 | 4/1942 | Chesny | 106/58 X |
| 3,192,059 | 6/1965 | Good et al. | 106/57 |
| 3,293,053 | 12/1966 | Alper et al. | 106/58 |
| 3,312,557 | 4/1967 | Hauranek et al. | 106/58 |
| 3,523,804 | 8/1970 | Fukatsu et al. | 106/58 |
| 3,808,014 | 4/1974 | Spencer et al. | 106/57 |

*Primary Examiner*—O. R. Vertiz
*Assistant Examiner*—Mark Bell
*Attorney, Agent, or Firm*—R. T. Majesko; J. N. Hazelwood

[57] ABSTRACT

A method of making magnesite grain having an MgO content between about 85 and 95% and consisting of periclase, calcium zirconate and dicalcium silicate.

8 Claims, No Drawings

METHOD OF MAKING MAGNESITE GRAIN

This is a continuation-in-part of Application Ser. No. 499,682, filed Aug. 28, 1974, now abandoned.

The trend in basic oxygen steel making has been toward larger and larger steel making vessels. The trend has put great demands on refractories for lining of the vessels. Many large vessels (that is, those exceeding 150 tons capacity) are partially lined with burned, tar impregnated, magnesite brick which is itself a relatively recent development. These vessels also utilize a tar bonded brick. This invention relates to an improved method of manufacturing magnesite grain particularly for use in both tar impregnated and tar bonded brick.

Magnesite brick are refractory brick manufactured substantially or entirely of dead burned magnesite. Dead burned magnesite is the granular product obtained by burning or firing magnesite ($MgCO_3$) or other substances convertible to magnesia (MgO), upon heating above about 3500° F. Long enough to form dense, hydration resistant granules. For convenience, those versed in the art frequently refer to dead burned magnesite merely as "magnesite". Magnesites are obtained from natural and synthetic source materials with generally equivalent properties. Natural source magnesites are products obtained by treating naturally occurring mineral ores, such as magnesite, breunnerite and brucite. The synthetic source magnesites are those that are obtained by precipitating the magnesium values from sea waters and brines. This invention concerns the manufacture of magnesite grain from synthetic sources since it is much more economical. Brick made from very pure synthetic sources of magnesites with lime: silica mol ratios slightly above or below 2:1 have very excellent refractoriness but, unfortunately, are somewhat difficult to manufacture. Also, many of these brick have a distressing propensity to spall under cyclic variation in temperature. Various fluxes, dead burning agents, etc., have been suggested as additives to the grain or to the brick made therefrom to increase density and to resist the spalling tendencies thereof; but such fluxes, while increasing the density and in some instances reducing the spalling tendency, decreased the refractoriness of the fired brick, reduce its resistance to corrosive atmospheres and are, generally, not all that might be desired.

The prior art has suggested mixing zircon with magnesite to obtain a refractory batch mixture. The earliest work on this subject of which I am aware is Rees and Chesters, Trans. Ceramic SOC., London 29, Page 309, May 1930, which suggested a mixture of magnesite and zircon with ball clay, apparently as a dead burning agent, to form a new refractory compound.

Comstock, in U.S. Pat. No. 1,952,120 recognizes the Rees and Chesters contribution to the art, but notes certain difficulties when following the teachings thereof. Comstock suggests the preparation of a magnesite zircon grog. This grog is made by grinding magnesite and zircon to a powder, fusing a mixture of about 80% of the powdered zircon and 20% of the powdered magnesite, cooling the fusion, and then powdering it; and using this powdered fused material as a binder for additional coarse magnesite. This magnesite bonded with powdered, fused grog is made into shapes and fired to about 2800° F. Comstock claims good volume constancy and resistance to spalling for shapes made according to the above method. It is, of course, evident that this double grinding or powdering and double burning or firing procedure, as suggested by Comstock, can be quite expensive in labor and materials treatment.

Good et al, in U.S. Pat. No. 3,192,059 teach the manufacture of magnesite-zircon brick made from batches comprising at least 10% zircon.

According to this invention, magnesite grain are made by mixing magnesium hydroxide slurry, a lime yielding material, such as dolomite hydrate and hydrated lime, and zircon in proportions sufficient to provide an MgO content between about 85 and 95%, by weight. The mixture is calcined and subsequently dead burned to provide a grain consisting essentially of about 2.5 to 7.7%, by weight, calcium zirconate, about 2.4 to 7.4%, by weight, dicalcium silicate, and the balance periclase. Preferably the grain contains an amount up to 10%, by weight, of calcium zirconate and dicalcium silicate.

The grain may be characterized mineralogically as having periclase crystallites surrounded by dicalcium silicate and finely crystalline calcium zirconate within the films. The grain has a specific gravity of more than about 3.3.

The slurry is calcined at a temperature sufficient to drive off all of the free water. It is then briquetted in a manner well known in the art and burned at temperatures in excess of 3000° F. for periods up to about five hours.

The only minerals present in the grain are periclase, dicalcium silicate, and calcium zirconate.

The molar ratio between lime and silica in dicalcium silicate is fixed, as is the molar ratio of lime and zirconia in calcium zirconate, and the range of MgO in the claims is fixed between 85 to 95%

The molar ratio of zirconia and silica in zircon is fixed and to obtain the three minerals claimed and no others, the amount of lime and zircon that must be added to the magnesium hydroxide slurry to obtain a given MgO content is also fixed.

For example, with the MgO content at either 85 or 95%, the chemical composition of the grains must be:

| | | |
|---|---|---|
| MgO | 85.00% | 95.00% |
| CaO | 7.18 | 2.39 |
| $ZrO_2$ | 5.26 | 1.75 |
| $SiO_2$ | 2.56 | 0.86 |

The mineral composition of these two magnesites must be:

| | | |
|---|---|---|
| Periclase | 85.00% | 95.00% |
| Dicalcium Silicate | 7.35 | 2.45 |
| Calcium Zirconate | 7.65 | 2.55 |

In the example to follow, all percentages are by weight; chemical analyses were obtained by spectrographic analyses with control by wet chemical analyses and are reported as oxides in accordance with the present practice in the refractories industry. All sizes are measured with Tyler Standard Screen Scale Sieves series.

EXAMPLE

The grain in this example was prepared by slurry mixing caustic magnesia analyzing about 98% MgO, with hydrated dolomite and minus 400 mesh zircon in an amount of 86.23%, 9.84% and 3.93% respectively. The slurry was dried and briquetted on a Komarek- Greaves Rolls in a manner similar to that disclosed in U.S. Pat. No. 3,060,000 (which is incorporated herein by reference). The briquettes were burned in a 3140° F. reheat with a five hour hold. The bulk specific gravity of the grain was 3.39. X-ray phase analysis indicated complete reaction of the dolomite and zircon to give about 10% dicalcium silicate and calcium zirconate with the remainder being periclase. The grain analyzed approximately 1.8% $SiO_2$, 0.4% $Al_2O_3$, 0.3% $Fe_2O_3$, 5.4% CaO, 3% $ZrO_2$ and the balance MgO.

The grain was then sized graded to minus 3 mesh through ball mill fines and mixed with 4% pitch, having a softening point between about 180° and 190° F., and 2.3% carbon black. The mix was formed into brick shapes by standard forming methods and baked at 500° F. with a five hour hold. The brick had a modulus of rupture average of 1670 p.s.i. and in the BOF drip slag test approximately 20 cc's were eroded.

Having thus described the invention in detail and with sufficient particularity as to enable those skilled in the art to practice it, what is desired to have protected by Letters Patent is set forth in the following claims.

The embodiments of the invention in which an exclusive property or privilege is claimed are defined as follows:

1. A method for making magnesite grain comprising mixing magnesium hydroxide slurry, lime yielding material and zircon in proportions sufficient to provide an MgO content between 85 and 95%, by weight, and calcining the mixture with subsequent dead burning to provide a grain consisting essentially of 2.5 to 7.7%, by weight, calcium zirconate, 2.4 to 7.4%, by weight, dicalcium silicate and the balance periclase.

2. Method according to claim 1 in which an amount up to 10% by weight, calcium zirconate and dicalcium silicate are present in the grain.

3. Method according to claim 1 in which the grain are characterized as having periclase crystallites surrounded by dicalcium silicate and finely crystalline calcium zirconate.

4. Method according to claim 1 in which the grain has a specific gravity of more than about 3.3.

5. A refractory grain comprising 85 to 95%, by weight, periclase, 2.5 to 7.7% by weight, calcium zirconate and 2.4 to 7.4%, by weight dicalcium silicate.

6. A grain according to claim 5, in which an amount up to 10%, by weight, calcium zirconate and dicalcium silicate are present in the grain.

7. A grain according to claim 5 which is characterized as having periclase crystallites surrounded by dicalcium silicate and finely crystalline calcium zirconate.

8. A grain according to claim 5 which has a specific gravity of more than about 3.3.